US010772462B2

(12) United States Patent
Iacobucci et al.

(10) Patent No.: US 10,772,462 B2
(45) Date of Patent: Sep. 15, 2020

(54) HEATING DEVICE

(71) Applicant: IACOBUCCI HF AEROSPACE S.P.A., Ferentino (FR) (IT)

(72) Inventors: Lucio Iacobucci, Ferentino (IT); Maurizio Ruspantini, Ferentino (IT); Massimiliano Marcoccia, Ferentino (IT); Roberto Mariani, Ferentino (IT)

( * ) Notice: Subject to any disclaimer, the term of this patent is extended or adjusted under 35 U.S.C. 154(b) by 396 days.

(21) Appl. No.: 15/559,017

(22) PCT Filed: Apr. 7, 2016

(86) PCT No.: PCT/IT2016/000088
§ 371 (c)(1),
(2) Date: Sep. 15, 2017

(87) PCT Pub. No.: WO2016/162895
PCT Pub. Date: Oct. 13, 2016

(65) Prior Publication Data
US 2018/0078085 A1  Mar. 22, 2018

(30) Foreign Application Priority Data

Apr. 10, 2015  (IT) .............................. RM2015A0151

(51) Int. Cl.
*F24H 1/12* (2006.01)
*H05B 3/78* (2006.01)
*A47J 31/44* (2006.01)
*A47J 31/54* (2006.01)
*F24H 1/10* (2006.01)

(52) U.S. Cl.
CPC .............. *A47J 31/54* (2013.01); *F24H 1/105* (2013.01)

(58) Field of Classification Search
CPC .......... F24H 1/102; A47J 31/542; H05B 3/06; H05B 3/42
USPC .......................................... 392/481, 489, 465
See application file for complete search history.

(56) References Cited

U.S. PATENT DOCUMENTS

| 1,027,970 | A | * | 5/1912 | Allen | ..................... | F24H 1/102 |
| | | | | | | 392/496 |
| 1,376,485 | A | * | 5/1921 | Verstraete | ............... | F24H 1/162 |
| | | | | | | 392/481 |
| 1,441,648 | A | * | 1/1923 | Walters | ................... | F24H 1/165 |
| | | | | | | 122/250 R |
| 1,513,087 | A | * | 10/1924 | Buhl | ..................... | H05B 6/108 |
| | | | | | | 219/630 |
| 1,671,677 | A | * | 5/1928 | Keeton | ................... | F24H 1/142 |
| | | | | | | 392/489 |
| 1,766,068 | A | * | 6/1930 | De Lannoy | ............. | F24H 1/121 |
| | | | | | | 392/493 |

(Continued)

FOREIGN PATENT DOCUMENTS

FR    2845261    4/2004

*Primary Examiner* — Lorne E Meade
*Assistant Examiner* — Lawrence H Samuels
(74) *Attorney, Agent, or Firm* — Themis Law

(57) ABSTRACT

The present invention relates to a water heating system (part number Iacubucci HF Aerospace AS0012480) for beverage dispensing machines. The heater has a double system: a pre-chamber, preferably of the spirally wound type, for pre-heating the water along a predefined path, and a chamber which is always full of water heated with resistors making direct contact with the water (or in some cases with a protection jacket) for maximizing the efficiency.

11 Claims, 4 Drawing Sheets

(56) References Cited

U.S. PATENT DOCUMENTS

| | | | | |
|---|---|---|---|---|
| 2,277,291 A * | 3/1942 | Blair | A47L 15/00 | 392/397 |
| 2,797,297 A * | 6/1957 | Nihlen | F24H 3/081 | 392/492 |
| 3,350,915 A * | 11/1967 | Staffin | G01K 15/005 | 374/3 |
| 3,483,357 A * | 12/1969 | Cunningham | F24H 1/225 | 392/492 |
| 3,673,385 A * | 6/1972 | Drugmand | F24H 9/1818 | 392/500 |
| 3,898,428 A | 8/1975 | Dye | | |
| 4,286,140 A * | 8/1981 | Dewulf | F24H 9/2014 | 165/156 |
| 4,395,618 A * | 7/1983 | Cunningham | H05B 3/82 | 165/160 |
| 4,563,571 A * | 1/1986 | Koga | H05B 3/42 | 219/543 |
| 4,808,793 A * | 2/1989 | Hurko | F24H 1/102 | 392/480 |
| 4,835,365 A * | 5/1989 | Etheridge | H01R 43/00 | 200/61.52 |
| 5,590,240 A * | 12/1996 | Rezabek | F24H 1/162 | 392/483 |
| 5,901,636 A * | 5/1999 | Witziers | A47J 31/36 | 99/283 |
| 6,067,894 A * | 5/2000 | Eugster | A47J 31/404 | 99/280 |
| 7,286,752 B2 * | 10/2007 | Gourand | F24H 1/142 | 392/479 |
| 9,014,548 B2 * | 4/2015 | Jang | F24H 1/0018 | 392/465 |
| 10,139,133 B2 * | 11/2018 | Castaneda | F24H 9/128 | |
| 2003/0026603 A1 * | 2/2003 | Castaneda | F24H 1/142 | 392/483 |
| 2007/0012685 A1 * | 1/2007 | Gourand | A47J 31/542 | 219/628 |
| 2009/0154909 A1 * | 6/2009 | Meyer | A47J 31/542 | 392/473 |
| 2010/0031889 A1 | 2/2010 | Williams | | |
| 2011/0041705 A1 * | 2/2011 | Reichl | A47J 31/542 | 99/323.3 |
| 2015/0226452 A1 * | 8/2015 | Adobati | A47J 31/54 | 392/454 |
| 2015/0327720 A1 * | 11/2015 | Blanc | A47J 31/542 | 392/493 |

* cited by examiner

HEATING DEVICE

TECHNICAL FIELD OF THE INVENTION

The present invention relates to a device for heating water. In particular, the device according to the invention (also called below "heater" or "heat exchanger" or simply "exchanger") may be used for machines for dispensing beverages such as coffee, tea or water. The device has been devised for the aviation sector, but may be used in other sectors.

The heater has a double system: a pre-chamber, preferably of the spirally wound type, for pre-heating the water along a predefined path, and a chamber which is always full of water and heated with resistors making direct contact with the water (or in some cases with a protection jacket) in order to maximize the efficiency.

PRIOR ART

Other heating systems for beverage dispensing machines are known. The problems to be solved are mainly associated with:

a) lack of space, since the apparatus which house them have particularly small dimensions b) Strict standards and technical requisites in view of the field of application.

The document EP 1,157,647 describes a coffee machine which uses a heated tank (30) where the water inside it is heated by means of contact resistors (34) and then used for dispensing. This system has the following drawbacks:
1) The heated water transfers heat to the canister (32) with a negative effect on the efficiency (heat dispersion) and safety (part gets very hot).
2) Normally, once the quantity of water present in the boiler has been dispensed, it is necessary to wait for the boiler to be filled and heated up again from room temperature.
3) The outside temperature of the boiler (if not suitably protected) is the same as the internal temperature so that there is the danger of scalding.

The document EP 1,369,068 describes a coffee machine which uses a heat exchanger (22) in which the water, which is made to follow a predefined path, is heated not by means of direct contact but owing to the effect of the heat transfer from an aluminium block (24) heated using resistors.

This system has the following drawbacks:
1) The system is not very efficient because much more heat is required compared to the programmed water temperature, in order to compensate for the losses which occur during transfer thereof from the resistor to the water via the aluminium block.
2) In order to ensure a correct equilibrium between power and dispensing speed, generally this system requires more time than the boiler in order to supply the same amount of water.
3) The external temperature of the exchanger (if not suitably protected) is very high and there is the risk of scalding.

Document WO2012/032554 describes an exchanger formed by a resistance located inside a helical shaped heating shaft which is in turn contained inside a chamber provided with a front closing element, a solenoid valve for regulating the water inlet, thermal safety pads and a temperature probe. The system is optimized to dispense up to 50 ml of coffee while maintaining an output temperature of 86+/−3° C. for the coffee.

This exchanger, which is of the open type, in addition to having the drawbacks of the devices described in the afore-mentioned documents, has the further drawback of not being able to dispense quantities of water greater than 100 ml without an inferior performance.

The document FR 2845 261 describes a heat exchanger comprising a pre-heating chamber, located in the innermost part of the exchanger, through which the liquid to be heated flows.

A novel device which overcomes the drawbacks of the prior art has now been devised since it allows the continuous dispensing of hot water with a low power consumption and which externally, during dispensing, minimizes the problem of the excessive temperature.

SUMMARY OF THE INVENTION

The present invention relates to a water heating device for beverage dispensing machines able to supply hot water continuously. The device is characterized in that it has a first stage or pre-chamber through which the water is forced to pass before entering the actual heating chamber. This first stage delays the arrival of the water inside the second stage or heating chamber and performs pre-heating of the water entering the second chamber which consists of an internal reservoir which houses the resistive elements used to obtain a stored amount of water at the dispensing temperature.

In particular, the pre-chamber is formed with a predefined winding path and the actual heating chamber is always full of water an and is heated by means of one or more resistors in direct contact with the water (or optionally provided with a protective jacket) in order to maximize efficiency.

The invention also relates to an apparatus for dispensing hot beverages, which houses one or more heaters according to the invention which may be positioned inside it in a horizontal or vertical position.

Further relevant details are described in the detailed description of the invention.

BRIEF DESCRIPTION OF THE FIGURES

In order to facilitate understanding of the invention, the attached figures show a non-limiting example of the invention in which.

DETAILED DESCRIPTION OF THE INVENTION

Figure 1:
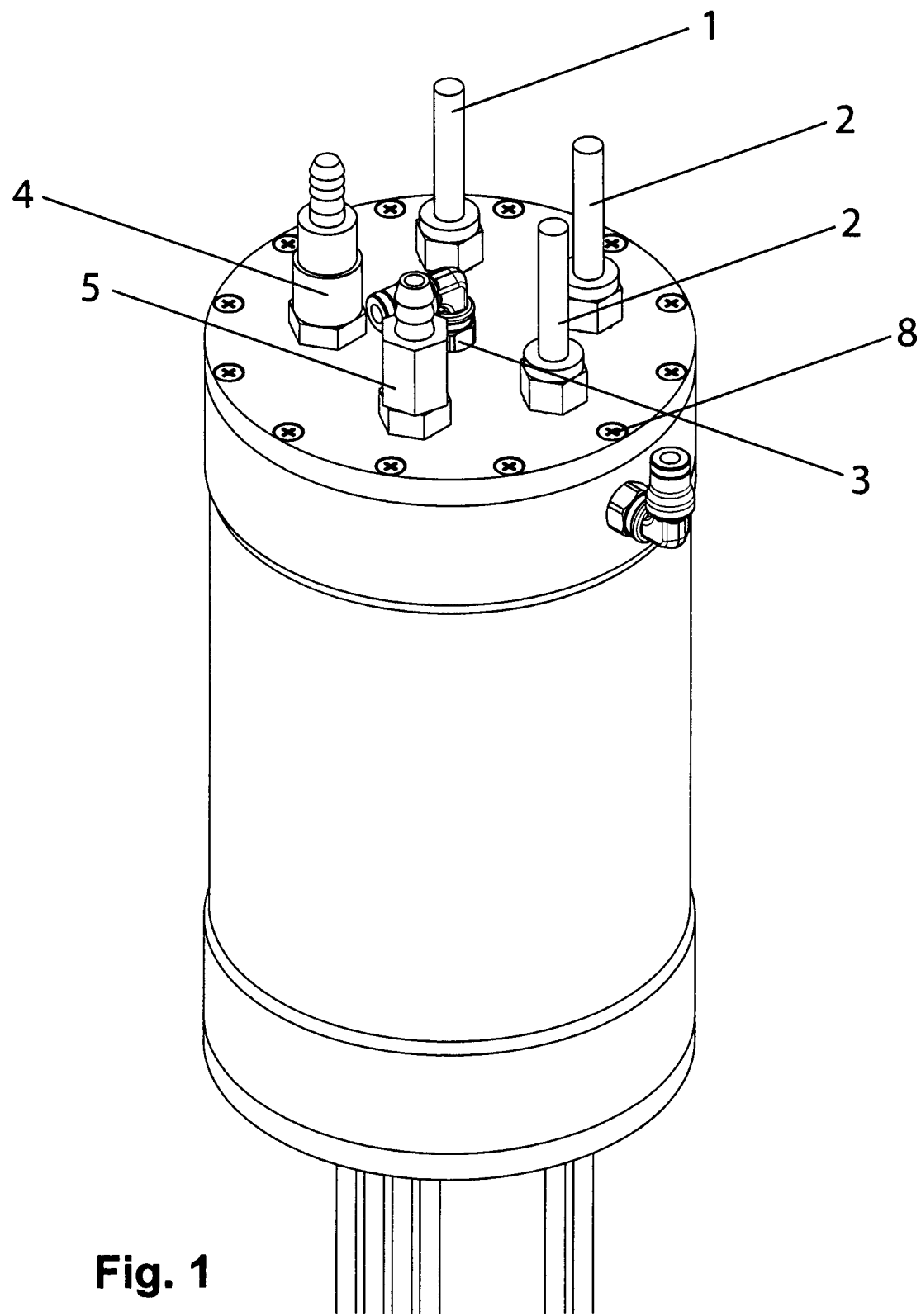
FIG. 1 shows a perspective schematic view, from above, of the exchanger in its installed position.
Figure 2:
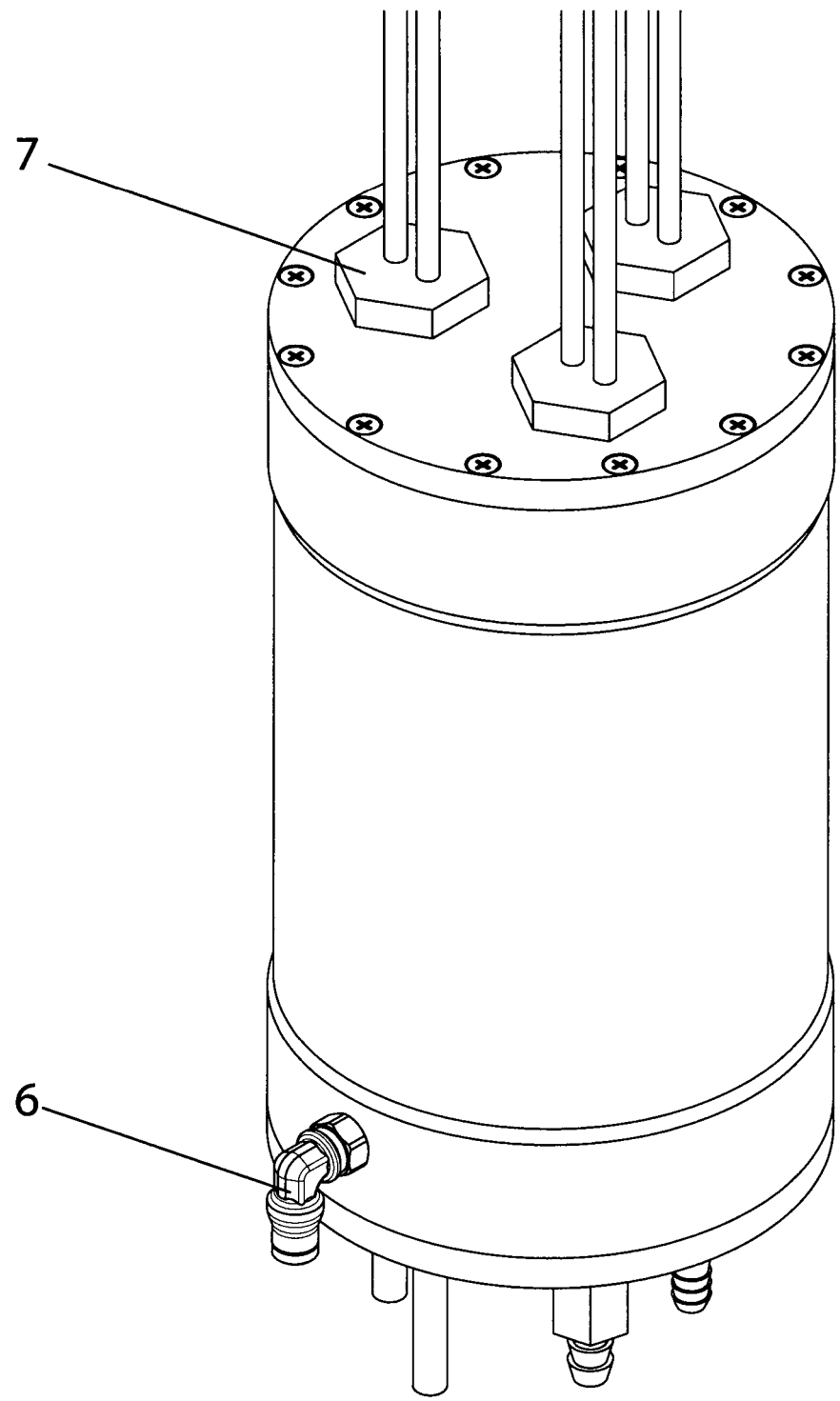
FIG. 2 shows a schematic perspective view, from below, of the exchanger which houses the resistors for heating the water.

The heater according to the invention comprises a first chamber and second chamber which are coaxial with each other and are closed at the ends by top and bottom covers and are connected to each other at the base via an opening or hole located in a position remote from the water inlet and outlet unions located respectively on the external wall of the heater and on the top cover.

The first chamber is also referred to as "outer chamber" and the second chamber as "inner chamber"; at least one resistance or resistor is provided inside this second chamber.

The water flows inside the exchanger via an inlet union located in a position remote from the opening connecting together the first and second chambers and flows into the second chamber through said opening as far a level check which interrupts the flow thereof, is heated by at least one of the resistors located inside the second chamber and is dispensed onto the beverage to be reconstituted via an outlet union located in the vicinity of the inlet union. During operation of the heater, the water inside the second chamber is always hot.

The wall separating the first and second chambers is advantageously formed so as to have, on the side facing the outer chamber, a helical or winding path which has the function of slowing down the entry of water into the inner chamber and allows pre-heating thereof, increasing the efficiency of the exchanger.

The power of said exchanger system is for example equal to 2800 W at 115 V ac three-phase and the system is optimized to supply up to 1.6 l of water, while maintaining the output temperature of the coffee at a minimum of 80° C.

DESCRIPTION OF A PREFERRED EMBODIMENT OF THE INVENTION

With particular reference to the attached figures, the device according to the invention is designed to allow the dispensing of hot water instantaneously and continuously. It comprises the following parts:
1. Temperature sensor
2. Water (and level) sensor
3. Outlet union
4. Safety (overpressure) valve
5. Vacuum relief valve
6. Inlet union
7. Resistor
8. Closing screws
9. Top cover
10. Sealing gasket
11. Spiral or winding passage
11a. Ribs or crests of the spiral or winding passage
12. Jacket (or casing or outer wall)
13. Bottom cover
14. Inner wall
15. Second chamber or inner chamber
16. Through-hole or opening between the first and second chambers
17. Internal dividing wall with holes
18. First chamber or outer chamber FIG. 3 shows the parts which make up the exchanger, which has the characteristic feature that it is of the hybrid type, i.e. "closed" in the rest condition, in the sense that the water is heated under pressure (i.e. the water entering the system and in fact the exchanger is provided with safety valves for overpressure (4) and negative pressure (5)) and "open" during dispensing, in the sense that the cold water enters the device through the inlet union (6), flows into the first chamber (18) and then into the second chamber (15) of the device, being heated and exiting hot through the outlet union (3).

Figure 3:
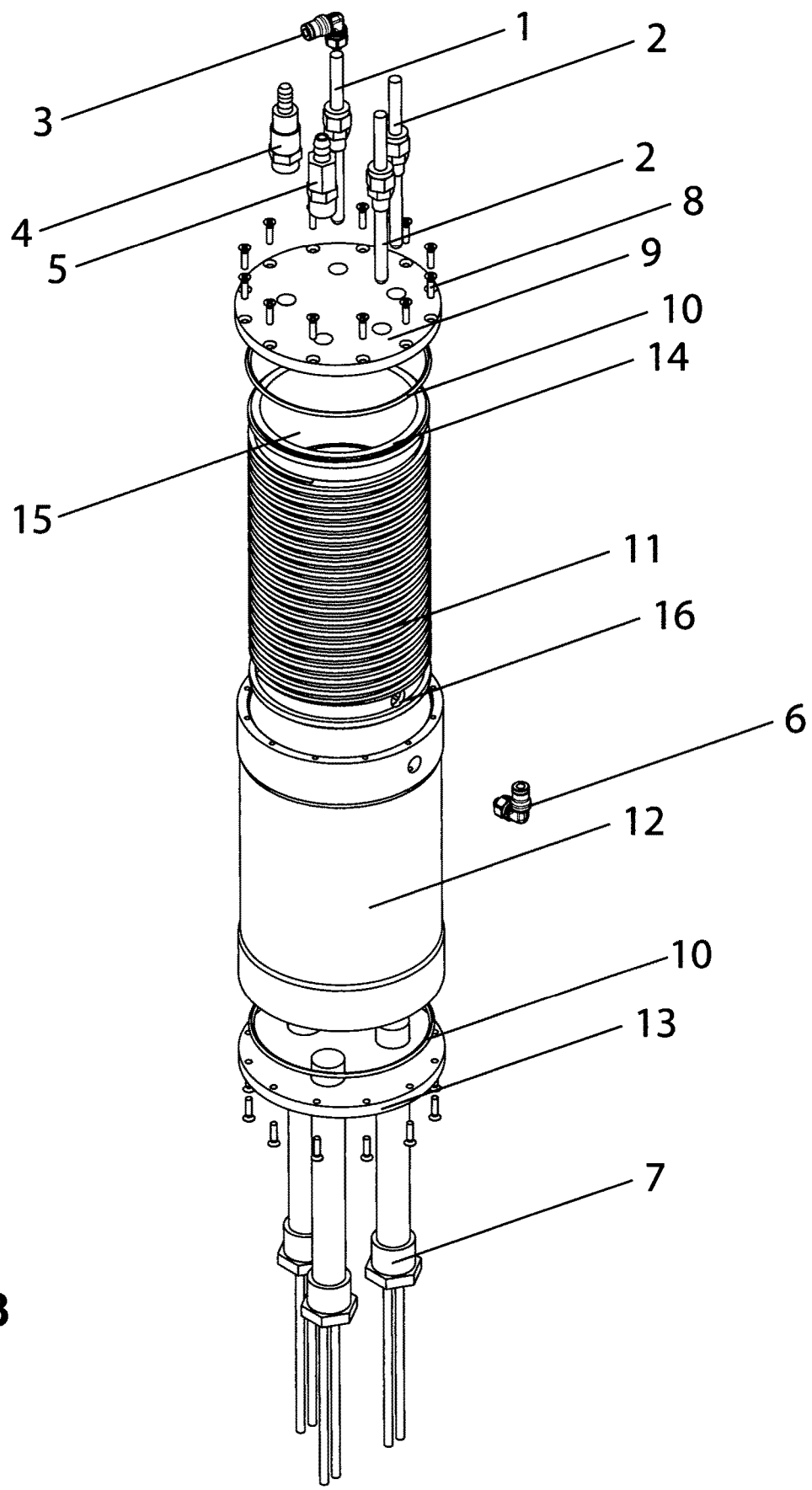
FIG. 3 is a schematic, fully exploded view of the exchanger.

As shown in FIG. 3, the exchanger is in the form of an elongated body with two coaxial chambers, the first chamber (18) thereof being the outer chamber and the second chamber (15) being the inner chamber and being closed at the ends by the top cover (9) and bottom cover (13).

The device comprises an outer casing (12) and an inner wall (14) which form the cavity or first chamber or outer chamber (18) into which the water enters via the union (6). The inner wall (14), along its part directed towards the outside of the exchanger, is advantageously provided with grooves (11) delimited by grooves or crests (11a) which terminate on the inner surface of the outer casing (12), forming a helical or spiral or winding path.

Therefore, the wall separating the first and second chambers is provided so as to form a helical or winding path for the water to be heated. All the parts are held together by fastening screws. The fluid-tightness of the chamber is ensured by sealing gaskets. The entry of water into the exchanger is regulated by the inlet union (6) and, during operation, there is always hot water present inside the second chamber (15) and pre-heated water inside the first chamber. Therefore, when the water enters the spiral or winding space it undergoes pre-heating to more or less high value due to the fact that the wall was already hot.

Advantageously, the inner and outer surfaces of the heater may be lined with a layer of anti-adhesive material known per se, for example plastic, such as Teflon®, or ceramic material or the like.

The inner chamber (15) forms the store of water which, once heated by the one or more resistors (7), is dispensed by the dispensing system (not shown) in order to reconstitute the beverage. Other parts of the heater are the top cover (9) and bottom cover (13), the sealing gaskets (10) and the closing screws (8). By means of the resistors (7), the water inside the chamber (15) is heated to the desired working temperature and is then dispensed via the outlet, which will ne preferably formed by a union (3).

Components for ensuring the operation and safety of the heater are provided on the top cover (9). In particular, these components consist preferably of the following:
- a safety valve (4), preferably with a channelled outlet calibrated for a pressure such as to ensure, in the event of an overpressure inside the said system, elimination thereof and safe operation thereof.
- a vacuum relief valve (5) which allows emptying of the inner chamber (15), if necessary, and the entry of air from the outside;
- one or more water presence sensors (2) for activating the power supply to the resistors and allowing dispensing of the beverage only and exclusively if the inner reservoir is full, i.e. if the inner chamber (15) is full of heated water;
- one or more immersion sensors (1), preferably of the semiconductor, but also electromechanical type, which are used for controlling the temperature of the water in real time in order to optimize management of the power and therefore consumption.

Description of Operation

Figure 4:
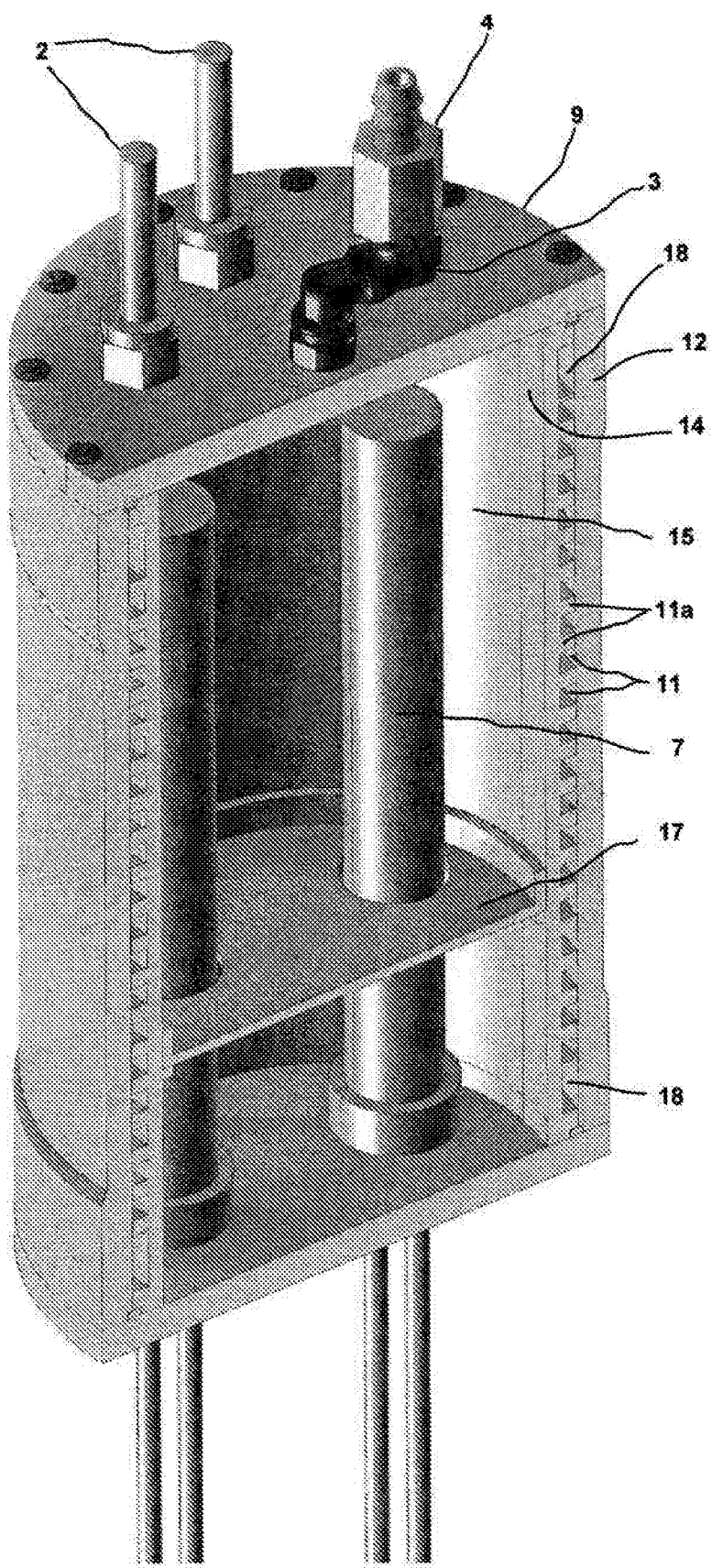
FIG. 4 is a schematic, cross-sectional view of the exchanger.

The first time that the heater is connected up, empty, to the hydraulic circuit, operation is as follows: the water enters via the union (6), passes into the groove (11) forming a helical or spiral or winding path and, via the hole (16) located at the end thereof, the water starts to fill the inner chamber (15) which houses the resistors (7) until it reaches the top cover (9) passing along the further predefined path formed by the internal dividing wall (17) provided with holes in the region of the three resistors, as can be seen in FIG. 4. When the water sensors (2) detect the presence of water it will be possible to power the resistors (7) which otherwise would risk damage since they are not suitable for "dry operation"; from this moment the water will start to be heated until the desired/preset temperature monitored by the corresponding probe(s) (1) is reached. The time required to reach the temperature is dependent mainly on the power available for the resistors.

When dispensing is required, the water inside the chamber starts to flow out through the associated outlet (3) and consequently fresh colder water enters into the internal reservoir (15) and via the spiral or winding passage (11) delimited by the ribs or peaks (11a) is pre-heated, again by the resistors. Having followed a spiral path, the water flows with a certain delay inside the chamber and this delay allows the system to heat it before it reaches the said outlet. The internal reservoir, owing to the central wall which acts practically as a separator between the hotter water flowing out and the colder incoming water since there are holes present only in the region of the resistors, also has internally a slower flow which likewise favours better heating of the water. The inner and outer surfaces of the heater are lined with a layer of anti-adhesive material such as Teflon®.

ADVANTAGES COMPARED TO THE PRIOR ART

The exchanger according to the invention offers a considerable series of advantages:
- safety, in that the external surface is never too hot during dispensing;
- greater heating efficiency while having a lower electric power consumption;
- adaptability, so as to be able to operate also with different power supplies;
- with the system it is possible to obtain a boiler which has a smaller water volume compared to a conventional boiler and therefore smaller overall dimensions.

The device may be arranged both horizontally and vertically. However, the most advantageous position is the vertical position with the resistors mounted at the bottom and the inlet union (6) and outlet union (3) for the water positioned at the top. This ensures that the presence of debris or limescale is limited as far as possible because they will tend to be deposited on the bottom of the cover (13), and hence far from the outlet pipe.

The presence of the spiral or winding path (11) containing a flow of cold water, which is partly pre-heated as a result of the temperature of the inner wall (14), ensures that the system reaches a thermal equilibrium such that it is able to dispense water continuously, differently from that which generally occurs in normal boiler systems.

The water cavity which is formed between the jacket or outer casing (12) and the winding passage (11), as a result of the groove is able to ensure an external temperature thereof which is lower that that of both boilers and a normal heat exchanger. A further improvement could be that of insulating the system so as isolate it and increase its thermal efficiency.

Owing to the use of the spiral or winding path (11) inside the external jacket (12) it is possible to dispense with a second storage reservoir, thereby reducing the overall dimensions of the system, while "pre-raising" the temperature of the water entering the system so as to increase its efficiency.

Although described in connection with a number of preferred embodiments and a number of non-limiting examples of implementation of the invention, it is understood that the scope of protection of said invention is determined solely by the contents of the claims below.

The invention claimed is:

1. A water heating device for beverage dispensing machines, comprising:
    an elongated body defined by two coaxial chambers, a first chamber thereof being on an outside and a second chamber thereof being on an inside, said first and said second chambers being each closed by a top cover and by a bottom cover; and
    an outer casing and an inner wall such as to define the first chamber into which water entering the heating device flows, said first and second chambers being in communication with each other via a communication opening located in a lower portion of the inner wall, said second chamber being provided with a water outlet union located on the top cover and a water inlet union, said second chamber being further provided and with one or more resistors,
    wherein the water heating device is constructed to cause the water,
    to flow inside the heating device via the inlet union to fill the first chamber,
    to pass through the communication opening connecting the first chamber to the second chamber,
    to flows into the second chamber until a level check interrupts flow of the water,
    to become heated by the one or more resistors located inside the second chamber, and
    when the water reaches a predetermined temperature, to be dispensed through said outlet union to provide a beverage.

2. The water heating device according to claim 1, wherein the inlet union is positioned in an upper portion of the outer casing.

3. The water heating device according to claim 1, further comprising one or more of the following: temperature sensors; water level sensors; safety valves; or vacuum relief valves.

4. The water heating device according to claim 1, wherein the inner wall has a side facing the outside of the heating device, the inner wall being provided with grooves which terminate on an inner surface of the outer casing, forming a helical, spiral, or winding path which slows down entry of the water inside the second chamber and allows a preheating thereof.

5. The water heating device according to claim 1, wherein the heating device is closed, such that the heating device is under pressure, during heating of the water, and is open, such that the heating device is not under pressure, during dispensing of the water.

6. The water heating device according to claim 1, wherein inner and outer surfaces of the water heating device in contact with the water are lined with a layer of anti-adhesive material.

7. The water heating device according to claim 1, wherein each of the top cover and the bottom cover are common to both the first chamber and the second chamber.

8. The water heating device according to claim 1, wherein the one or more resistors extend upwardly from the bottom cover of the second chamber.

9. The water heating device according to claim 1, further comprising a dividing wall positioned transversely within and across the second chamber, the dividing wall having one or more openings that provide for extension of the one or more resistors therethrough, the one or more openings being dimensioned to further provide for an upward passage of the water therethrough.

10. An apparatus for dispensing hot beverages, comprising:
    one or more heaters housed in the apparatus, wherein the heater are positioned inside the apparatus horizontally or vertically, and wherein the one or more heaters each comprise:

an elongated body defined by two coaxial chambers, a first chamber thereof being on an outside and a second chamber thereof being on an inside, said first and said second chambers being each closed by a top cover and by a bottom cover; and an outer casing and an inner wall such as to define the first chamber into which water entering the heater flows, said first and second chambers being in communication with each other via a communication opening located in a lower portion of the inner wall, said second chamber being provided with a water outlet union located on the top cover, said second chamber being further provided with one or more resistors, wherein the elongated body is constructed to cause the water, to flow inside the elongated body via an inlet union to fill the first chamber, to pass through the communication opening connecting the first chamber to the second chamber, to flows into the second chamber until a level check interrupts flow of the water, to become heated by the one or more resistors located inside the second chamber, and when the water reaches a predetermined temperature, to be dispensed through said outlet union to provide a beverage.

11. The apparatus according to claim 10, wherein the apparatus is a coffee machine adapted to be used in an aviation device.

* * * * *